United States Patent
Salihi

[15] 3,671,832
[45] June 20, 1972

[54] SUPPRESSION OF TORQUE MODULATION IN ELECTRIC MOTOR DRIVE SYSTEMS BY FREQUENCY CONTROL

[72] Inventor: Jalal T. Salihi, Birmingham, Mich.
[73] Assignee: General Motors Corporation, Detroit, Mich.
[22] Filed: May 6, 1971
[21] Appl. No.: 140,843

[52] U.S. Cl. ........................................................ 318/231
[51] Int. Cl. ........................................................ H02p 7/42
[58] Field of Search ............................ 318/230, 231, 341

[56] References Cited
UNITED STATES PATENTS
3,323,032  5/1967  Agarwal et al. ...................... 318/231

Primary Examiner—Gene Z. Rubinson
Attorney—E. W. Christen and C. R. Meland

[57] ABSTRACT

An electric motor is supplied voltage having a continually varying frequency to obviate cyclic torque pulsations or torque modulation observed to cause vibrations in the motor and load. An AC alternator is connected through a frequency changer with an induction motor in a controlled slip motor drive system including a continually varying slip frequency signal to shift the slip frequency in relation to a nominal value to prevent cyclic torque pulsations. The slip frequency is varied at a rate such that the rotor and load operate at the nominal slip, being incapable of following the changes in input frequency.

2 Claims, 3 Drawing Figures

PATENTED JUN 20 1972  3,671,832

INVENTOR.
Jalal T. Salihi
BY
C. R. Meland
ATTORNEY

SUPPRESSION OF TORQUE MODULATION IN ELECTRIC MOTOR DRIVE SYSTEMS BY FREQUENCY CONTROL

This invention relates to a slip frequency control motor drive including a provision for continually shifting slip frequency to obviate mechanical vibrations in the motor and load observed to result from torque modulation.

In AC to AC drive systems for induction motors, torque modulation or fluctuations in power flow have been observed in frequency bands where the frequency of the power to the motor is a submultiple of the generator frequency. This torque modulation is confined to discrete bands of frequencies, each limited in extent to a fraction of a cycle. It has been observed, in connection with the torque modulation, that modulation buildup is gradual, requiring a definite minimum time. The effects of torque modulation are manifested as mechanical vibrations by the motor and load and, torque modulation has been observed to be particularly prominent in systems operating at low ratios of motor to generator frequency.

Based on the observed phenomenon, the present invention contemplates continuous adjustment of input frequency to preclude mechanical vibrations resulting from the noted torque modulation. In an AC induction motor slip frequency control drive arrangement, the requisite variation of input voltage frequency is effected by continual adjustment of the reference slip frequency control signal. The frequency of the slip frequency control is shifted at a frequency high with reference to the mechanical time constant of the system to prevent the rotor speed from following the changing drive frequency; the magnitude of the frequency shift is selected to exceed the magnitude of the narrow bands in which modulation occurs and to minimize adverse effects on efficiency and motor power factor.

Prior art motor control arrangements use input voltages having continually varying frequencies for certain applications. For example, U.S. Pat. No. 3,165,686 MacDonald discloses a motor drive using such variations in conjunction with wind-up reels for fibrous strip material. The control of MacDonald is intended to provide continuous adjustments of motor operating speed to accommodate the peculiarities of the wind-up reel load arrangement. Thus, as described in the patent, the frequency variation of the energization voltage to the motor is operative to vary the speed of the motor in a periodic fashion about a nominal speed.

In contrast with this known motor drive arrangement, the instant invention relies on frequency variations at a rate exceeding the mechanical time constant of the motor such that the inertia of the motor and load prevent any change in motor operating speed in response to changes in input drive voltage frequency.

Accordingly, it is an object of the present invention to provide an AC induction motor slip frequency control including provision to continually vary slip frequency at a rate such that the motor operates at a constant speed though the input frequency is continually changed to obviate observed torque modulation causing mechanical vibrations.

Another object of the present invention is to provide an AC induction motor with slip frequency control of the type described wherein the frequency of the instantaneous slip control signal is varied in relation to a nominal value, while the motor operates at a constant speed determined by the nominal slip frequency.

These and other objects and advantages of the present invention will be apparent in light of the following description wherein the figures listed below are incorporated as illustrative of a preferred embodiment.

Figure 1:
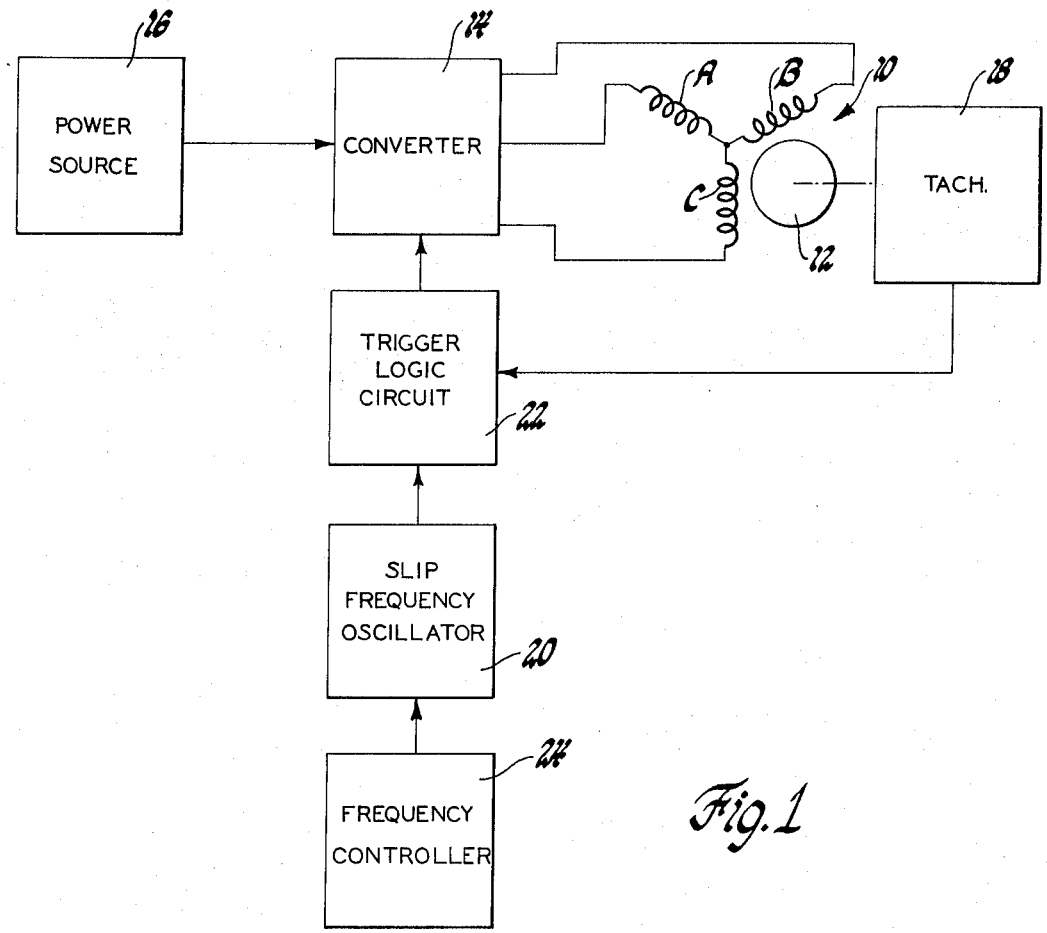
FIG. 1 is a schematic diagram, partially in block form, of the motor control of the present invention.

Reference should now be made to FIG. 1 wherein an AC induction motor generally shown at 10 including phase windings A, B, and C and rotor 12 is supplied alternating current from a converter 14. A power source 16 provides input power to the converter 14. Power source 16 can take the form of an alternator providing an alternating frequency output, or it can take the form of a DC source providing DC input power to the converter 14. In the preferred form, the power source 16 is an alternator operating at a frequency substantially exceeding the frequency of operation of converter 14 which functions as a frequency changer supplying controlled voltage to the motor 10.

Slip frequency control is effected, in the system of the drawing, by combining a signal related to the speed of motor operation from tachometer 18 with a slip frequency control signal from slip frequency oscillator 20 in trigger logic 22. The trigger logic 22 periodically and sequentially switches controlled rectifiers in the converter 14 to define the frequency of the three-phase voltage supplied the motor 10. This slip frequency control is generally known to those skilled in the art, a typical system is disclosed in U.S. Pat. No. 3,323,032 Agarwal et al.

Torque modulation in discrete bands of frequencies has been observed in AC to AC drive systems of the type shown in the drawing. Two characteristics of the observed modulation of importance to the present invention are: (1) the torque modulation requires a definite minimum time for buildup, transient operation within the bands wherein modulation has been observed does not result in noticeable torque modulation unless the time is appreciable with respect to the buildup time; (2) the torque modulation occurs in sharply defined frequencies bands, each limited in extent to a fraction of a cycle. In the present invention, torque modulation and resultant motor-load vibrations are obviated by continually varying the frequency of the motor input voltage. The frequency of variation is selected such that the mechanical time constant of the motor and load effectively filter the voltage frequency changes; the motor operates at a speed determined by the nominal input frequency. The extent of the sweep of frequency in the input voltage is selected to exceed the extent of the bands wherein modulation has been observed, thus the motor is never operated for an extended time at a frequency within any modulation band. Efficiency and power factor for the motor system are affected by the extent of the frequency sweep and, accordingly, the sweep is set at the minumum value consistent with the requirement that it exceed the width of the modulation bands.

In the present invention, the slip frequency oscillator 20 has an output frequency determined in part by a frequency controller 24. In this manner, the instantaneous value of the motor slip frequency is varied in response to the control of frequency controller 24, providing a variable frequency input drive voltage to the motor.

Figure 2A:
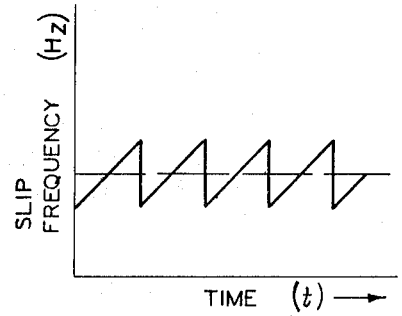
FIGS. 2A and 2B are graphs depicting two alternative slip frequency variations suitable for inclusion in the present invention.
Figure 2B:
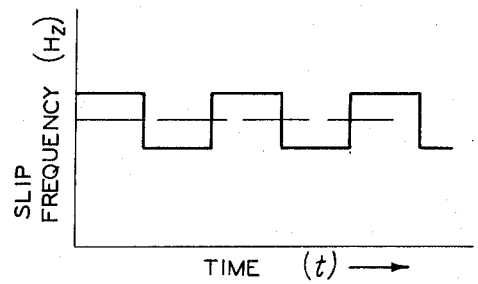

Frequency controller 24 can take a variety of forms generally known in the art for continually varying the output frequency of an oscillator. For example, a switch operating at a predetermined frequency can alternate between two capacitance values to provide variations according to the graph of FIG. 2B. The slip frequency oscillator 20 provides an output determined by the capacitance value connected in the circuit. The frequency of variation is determined by the switching rate of the selector switch. In the alternative, a motor operating to drive a continually varying capacitance can provide frequency variations such as those of FIG. 2A, wherein the rate of change of oscillator frequency is determined by the drive motor operating speed. Additional arrangements for providing a variable frequency output from an oscillator are generally known and could be adapted to the slip frequency control of the drawing.

The term mechanical time constant of the motor as used herein and in the appended claims relates to the response time of the mechanical system comprising the motor output shaft and load and specifically to the ability of this mechanical combination to follow variations in input drive voltage frequency. Frequency variations at a rate high with respect to the mechanical time constant of the motor are effectively filtered such that the motor operates at an average or nominal value. For example, in FIGS. 2A and 2B, the average slip frequency for the waveforms defines the nominal operating slip frequency of the motor in spite of the fact that the instantaneous slip frequency of the motor varies. Thus, the input voltage has a continually changing frequency to ensure against power modulation and resultant mechanical effects while simultaneously the motor operates at a constant speed, being unable to follow the changes in input frequency.

The foregoing has proceeded in terms of a preferred embodiment; it should be understood that various changes and modifications could be engrafted on the example within the scope of the appended claims.

I claim:

1. An AC induction motor control, comprising: an AC induction motor, a source of power, a frequency changer interconnecting said motor and said source of power for controlling the frequency of an alternating voltage applied to said motor, slip frequency control means coupled with said frequency changer and said motor for controlling the output frequency of said frequency changer and motor slip frequency, and means connected with said slip frequency control means to continually vary the slip frequency in relation to a nominal slip frequency value at a rate of variance in excess of the mechanical time constant of the motor such that the motor operates at a constant speed though the frequency of input power cyclically varies, whereby torque pulsations associated with energization of the motor are obviated as a source of mechanical vibration during motor operation.

2. An AC induction motor control, comprising: an AC induction motor, a source of AC power, a controlled rectifier converter interconnecting said motor and said source of AC power, slip frequency control means coupled with said converter and said motor to sequentially and periodically gate the controlled rectifiers of said converter to control converter operating frequency and motor slip frequency, and means connected with said slip frequency control means to continually vary the slip frequency in relation to a nominal slip frequency value at a rate of variance in excess of the mechanical time constant of the motor such that the motor operates at a constant speed though the frequency of input power cyclically varies, said last named means causing excursions of the slip frequency exceeding the width of frequency bands defining torque modulation, whereby torque modulation associated with energization of the motor is obviated as a source of mechanical vibration during motor operation.

* * * * *